Feb. 25, 1958 N. M. RUST 2,825,056
RADAR SYSTEMS
Filed April 12, 1954 2 Sheets-Sheet 2

INVENTOR
NOEL MEYER RUST,
BY Baldwin & Wight
ATTORNEYS

United States Patent Office 2,825,056
Patented Feb. 25, 1958

2,825,056

RADAR SYSTEMS

Noel Meyer Rust, Worthing, England, assignor to Marconi's Wireless Telegraph Company Limited, London, England, a British company Application April 12, 1954, Serial No. 422,609

Claims priority, application Great Britain April 16, 1953

6 Claims. (Cl. 343—14)

This invention relates to radar systems and has for its object to provide improved radar systems which will automatically follow a target in range i. e. distance away from the system.

In a well known type of radar system, hereinafter termed a radar system of the ranging oscillator type, the transmitted radio energy is modulated in frequency by the output from an adjustable local oscillator, hereinafter termed the ranging oscillator. Assuming, for the moment, a stationary target (so that consideration of the action of the system is not complicated by Doppler frequencies) it will be seen that, if the ranging oscillator is adjusted to a frequency such that its period is equal to the echo time—i. e. the propagation time to the target and back—the ranging oscillator modulation frequency component in the received echo will be in phase with the output from the ranging oscillator and therefore, by adjusting the ranging oscillator frequency until this in-phase condition is achieved and noting the ranging oscillator frequency when this happens, the range of the target may be computed. Indeed the ranging oscillator may be calibrated directly in terms of range. The present invention relates to radar systems of the ranging oscillator type and provides improved systems of the type which will automatically follow a target in range by automatically adjusting the ranging oscillator frequency in accordance with the range of the target.

According to this invention a radar system comprises a transmitter, a ranging oscillator connected thereto to modulate the frequency thereof, a source of further oscillations, hereinafter termed a wobble oscillator, the latter oscillator being connected to the ranging oscillator to wobble, i. e. to frequency modulate, the oscillations thereof, an echo signal receiver, a mixer for mixing received signals with signals derived direct from the transmitter, means for extracting from the resultant of such mixing a component of the wobble frequency, means for comparing the extracted component with a reference frequency taken from the wobble oscillator to produce an error signal, and means for utilizing said error signal to control the mean frequency of the ranging oscillator to maintain said ranging oscillator ranged upon the target from which the echo signals are reflected.

Preferably the system is a C. W. system.

Preferably also there is provided, between the mixer and the means for extracting the component of wobble frequency, a Doppler frequency filter whereby selection may be made of targets whose radial velocities with relation to the radar system, lie within predetermined limits.

The oscillations fed from the wobble oscillator to the ranging oscillator may, for convenience, be sinusoidal but the reference frequency wave as employed for comparison with the extracted component is preferably a squared wave.

The invention is illustrated in the accompanying drawings, in which drawings Fig. 1 shows in simplified block and schematic diagram form, one embodiment of the invention as applied to a frequency modulated C. W. radar system;

Figure 1:
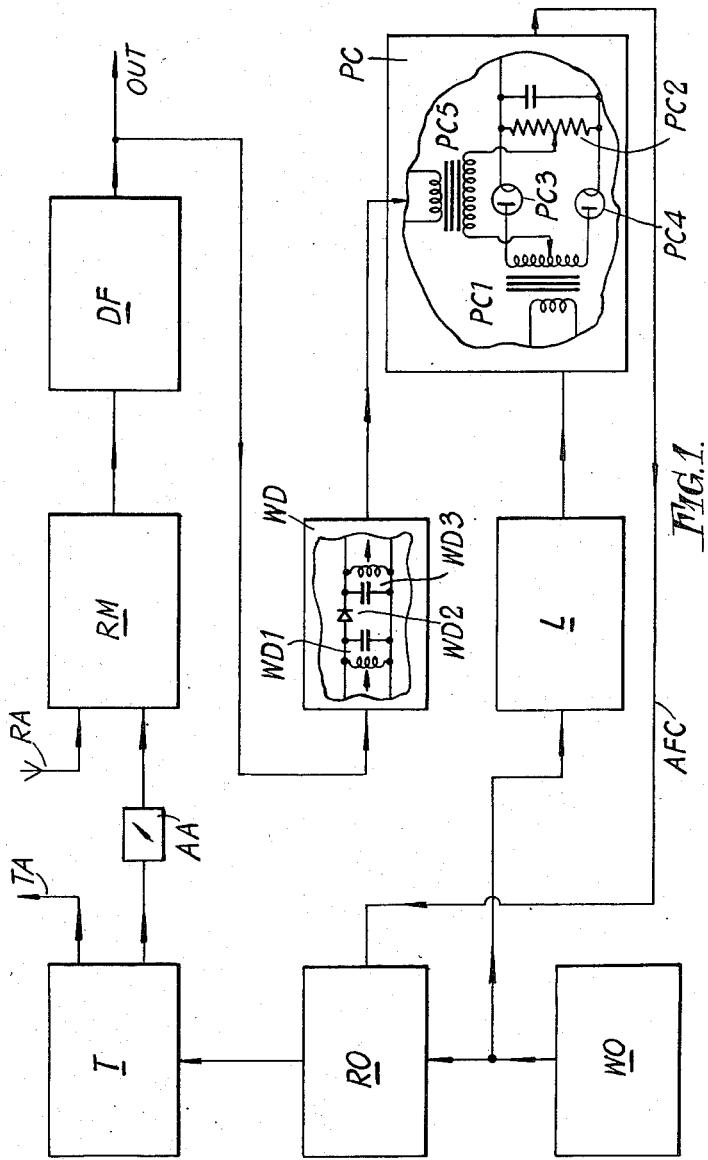

In Fig. 1 only those parts of the radar system are shown which are necessary to an understanding of the present invention and other parts, which are well known per se and are not concerned with the present invention are not shown. Thus no means are shown for displaying targets or for scanning a volume of space for finding particular targets or for training the system in azimuth. The present invention is concerned solely with the provision of means whereby a radar system may be "locked on" to a target in range, i. e. caused to follow it in range. The system may however also incorporate means for automatically locking on to a target in azimuth as well as for searching in azimuth and range. Such means, being well known per se and forming no part of the present invention, will for simplicity of description, be neither shown nor described herein. Also, in Fig. 1, separate transmitting and receiving aerials are represented. This too is for simplicity of presentation and obviously combined transmitting-receiving aerials may be used as well known.

Referring to Fig. 1, T is a C. W. transmitter which transmits from an aerial TA, a very high frequency wave which is modulated in frequency by a ranging oscillator RO, the frequency of which is in turn wobbled i. e. modulated by a wobble oscillator WO the output from which is of a frequency lower than the lowest Doppler frequency which the system is designed to handle, it being assumed that the said system is intended to range-lock upon relatively fast moving targets.

Echo signals received upon a receiving aerial RA are fed to a receiver-mixer RM where they are mixed with energy taken direct (i. e. without reflection from a target) from the transmitter via an adjustable attenuator AA. The resultant from mixing, after such amplification as may be required, is passed through a Doppler frequency tuner or filter DF adapted to reject frequencies other than those corresponding to target radial velocities within a predetermined, usually narrow, range of velocities. The filter DF may be of any known type and arrangement and its output is passed via lead OUT to any known target display arrangement (not shown). The filter DF is not essential but its provision is preferred principally because it increases useful signal-noise ratio by eliminating undesired signals.

Filtered output from the filter DF is passed to a wobble frequency detector and amplifier WD. In its simplest form the detector may comprise a tuned circuit WD1 resonant at the Doppler frequency of the target from which the echo signals are being received, and a rectifier WD2. The output from the rectifier contains the wobble frequency, the extraction of which is provided by a tuned circuit WD3 resonant at the wobble frequency. An amplifier stage may precede the tuned circuit WD1 and another amplifier stage may follow the tuned circuit WD3. The extracted wobble frequency component thus obtained from the unit WD is fed as one input to a phase comparing circuit PC whose second input is constituted by a reference wobble frequency derived through a limiter L from the wobble oscillator WO. The circuit PC operates to give zero output when its two inputs are in phase, and an error signal output whose magnitude and polarity are representative of the amount and sense of the departure from the inphase relationship between said two inputs. The error signal is fed over the lead AFC to the ranging oscillator RO where it is used in any manner known per se to control the mean frequency of the ranging oscillator. As shown the network PC includes a transformer PC1 having a center tapped secondary and through whose primary the input from the oscillator WO is applied; a capacity shunted center tapped resistance PC2 from across which the error signal is taken; a diode or other rectifier PC3 connecting one end of the transformer secondary to one end of the resistance PC2; a second diode or rectifier PC4 connecting the remaining end of the transformer secondary to the remaining end of the resistance; and a further transformer PC5 through which the input from the wobble frequency detector WD is fed and whose secondary connects the mid-point of the secondary of the transformer PC1 to the mid-point of the resistance PC2. Other forms of phase sensitive error signal producing networks as known per se may, however, be substituted for that shown at PC.

When the frequency of the modulation cycle is such that the inverse of the frequency, or the periodic time of the modulation, becomes shorter than the echo time and finally approaches that of the echo time there is obtained more energy in a circuit tuned to the Doppler frequency.

On the other hand as the periodic time—approaching from the initial condition of much longer than the echo time—is made closer to the echo time, the beat frequency remains longer within the band pass of the Doppler frequency tuner, until, when it is exactly synchronized, it remains in the band all the time. In the synchronous condition the beat frequency is exactly the same as if the transmitter were not modulated, and is equal to the Doppler frequency. In this manner the amplitude of the Doppler note, when the transmitter is subjected to frequency modulation is a function of the range error, or time error, from exactly synchronous conditions.

In practice, to avoid ambiguities, it is always arranged to approach synchronous conditions with the initial modulation period longer than the echo time.

The mean frequency of the ranging oscillator RO may be controlled by the voltage fed over the line AFC in any suitable way known per se. It is convenient to use, for this oscillator, a resistance capacity controlled type of oscillator as the frequency is inversely proportional to either capacity or resistance. Therefore as the required frequency is also inversely proportional to the capacity or resistance, the range indication can be made linear either with capacity or resistance. Two forms of control are required—a control of the average frequency within the extreme limits, to be effected by the error signal, and the sinusoidal wobble control over comparatively fine limits. It is convenient to carry out both these controls by small motors, the former acting on the resistance network and controlled by the error signal fed over the line AFC and the latter acting on rotating condensers parallelled with fixed condensers so that the required wobble range is obtained. The latter motor rotates continuously and may be simply a low frequency (e. g. 50 C./S.) synchronous motor.

With this arrangement the wobble oscillator causes the ranging oscillator frequency to wobble about a central frequency determined by the momentary tuning of the said ranging oscillator. When this central frequency is of a time period exactly equal to the echo time i. e. when the ranging oscillator wobble is correctly centered on the correct ranging frequency, the output from the filter DF is equally reduced at the two ends of the wobble swing as compared to that which occurs at the center of the wobble. Accordingly, in this condition, the input to the phase comparer PC from the detector WD is a symmetrical swing, of twice the wobble frequency and there is zero error signal. If, however, this condition does not exist, the input swing from unit WD to unit PC becomes asymmetrical and an error signal dependent upon the direction and magnitude of asymmetry is produced. The action is more fully explained with reference to the explanatory graphical figures.

Figure 2:
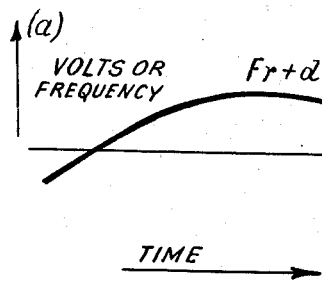
Fig. 2 is a characteristic curve of the wobbling oscillator voltage plotted with respect to time.

Fig. 2 is a curve connecting wobbling oscillator voltage (ordinates) with time (abscissae). When the ranging oscillator is correctly centered with respect to the range of the target being received, the curve also connects ranging oscillator frequency (ordinates) with time (abscissae) the chain line $F_r$ being the center frequency and $d$ being the deviation or wobble amplitude.

Figure 3:
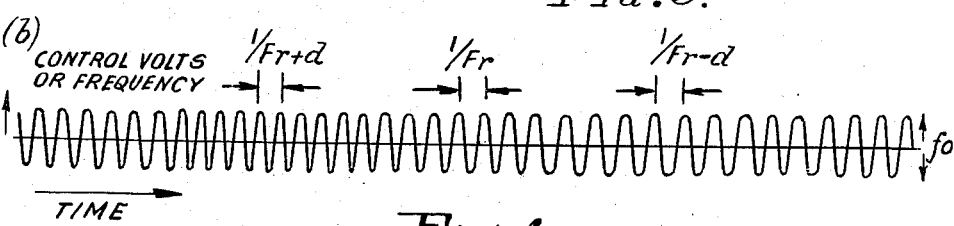
Fig. 3 is a characteristic curve of the frequency controlling voltage applied from the wobbled ranging oscillator.

Fig. 3 shows the form of the frequency controlling voltage applied from the wobbled ranging oscillator to modulate the transmitted frequency plotted against time as abscissae. It also shows, to a difference scale of course, the transmitted frequency. This is varied about a mean or carrier frequency $f_0$. The frequency of the modulation envelope is itself varied, at the wobble frequency (Fig. 2) from $f_r-d$ through $f_r$ to $f_r+d$ and thence back again.

From Fig. 2 by mathematical analysis using the theory of frequency modulation, a curve may be derived which indicates for any given conditions of frequency swing the amplitude of a signal which will be received in the Doppler frequency tuner. This curve may be plotted as received volts against time error. Alternatively, there may be derived from the velocity of propagation of radio waves, a range error scale which may be substituted for the time error scale. This is also shown in Fig. 4.

Figure 4:
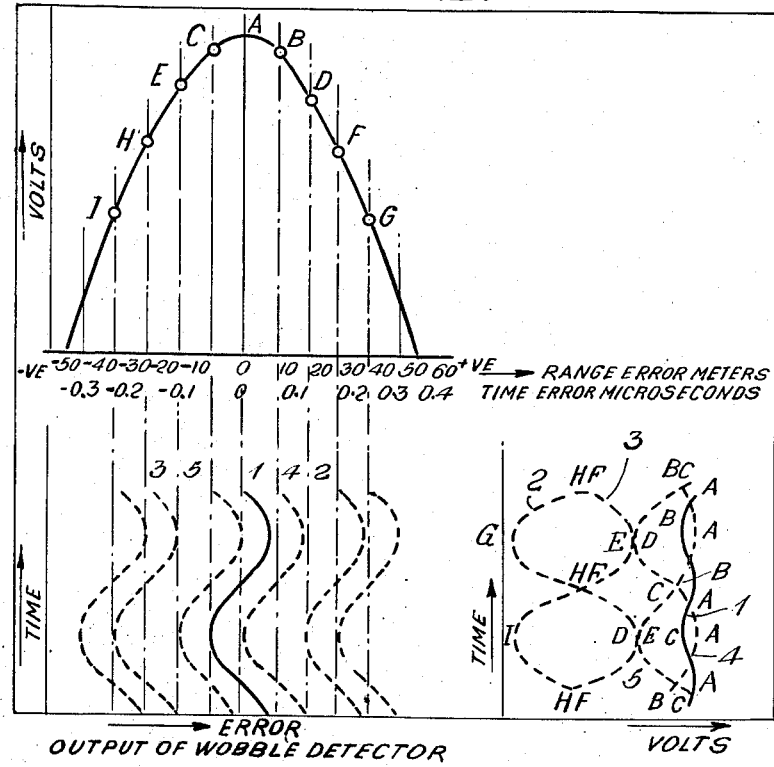
Fig. 4 is an explanatory chart showing the relationship of the various values of frequency and the amplitude produced at the wobble detector.

Figure 4 is a two part figure illustrating the effect on the amplitude produced at the wobble detector WD of various values of $f_r$. The upper part of Fig. 4 connects amplitude of the Doppler signal (ordinates) with ranging oscillator frequency (abscissae) over a small range of frequency. In order to show the effect clearly in terms of range and range error, the Bessel function defining amplitude has been plotted against abscissa scales of time error in synchronization (micro-seconds) and corresponding range error (metres), the calculations resulting in the curve shown being made for an installation with a total transmitted frequency deviation of 2 mc./s. In the lower part of Fig. 4 is shown the slow wobble cycle with time as the vertical axis, and equivalent time error the horizontal. The sine wave curves 1, 2, 3, 4 and 5 correspond to different range error wobbles. In the full line curve 1, which represents the case where the average frequency is correctly synchronized i. e. the wobble is correctly centered on the range and the range error is zero, the effect of the wobble is to vary the amplitude through the cycle ABACA . . . and so on (see the upper part of Fig. 4). The corresponding voltage wobble is shown in full lines on the right of the lower part of Fig. 4 where the corresponding amplitude indicating letters ABCDEFGHI of the upper part of Fig. 4 are repeated. As will be seen the voltage wobble is a double wobble frequency ripple with equal voltages at positions B and C. The broken line curves 2 and 3 show range error wobbles equally spaced on opposite sides of wobble curve 1. The amplitude cycle of curve 2 is FGFDF . . . while that for curve 3 is HEHIH. . . . The corresponding voltage wobbles are shown, in the same manner as previously, by the broken line curves to the right of curve 2 and which pass through the named amplitude indicating letters. These two voltage wobble curves FGFDF and HEHIH are of opposite phase. Curves 4 and 5 are also drawn for intermediate range error values and although the resultant voltage wobble curves are far from sine wave shape it will be seen that effective error signals are still available. For curve 4 the amplitude cycle is BDBAB . . . and for curve 5 the amplitude cycle is CACEC. . . . The broken lines extend between the points on the upper curve shown at I, H, C, A, B, F and G, and the lower curves numbered 1 to 5 indicate that the respective axes of the curves in the lower part of the figure are situated at the respective points indicated in the upper curve.

The operation of the unit PC will be fairly evident from Fig. 1 but the following will be of assistance in fully appreciating its action. Preferably, though not necessarily the reference signal applied through transformer PC1 is limited by the limiter L to be of rectangular, or approximately rectangular form. This reference signal is applied to the diodes PC3 and PC4 to make them conductive in turn on successive half cycles. When no signal comes from the detector WD to the transformer PC5, the storage condenser across resistance PC2 is equally charged and discharged by the alternate diode conducting cycles and no error signal is produced. When the ranging oscillator is correctly centred on the range and curve 1 of Fig. 4 applies the double frequency wobble adds equally to the voltages of the two diodes and there is zero error signal produced. For all other conditions, however, e. g. those of curves 2 to 5 of Fig. 4, the signal input through transformer PC5 adds to the voltage from one diode and subtracts from that of the other, or vice versa, depending upon whether the ranging oscillator is centered above or below the proper value, and an error signal of polarity dependent on the sense of the range error is produced.

It is a fairly simple matter to provide for increase of the frequency deviation of the transmitter as a signal is tuned in though, in order not to complicate the drawings, no means for doing this are shown. Such deviation increase may be fully automatic or semi-automatic. For semi-automatic action, which is simple to obtain, and adequate for most conditions, a long time constant amplitude control of the ranging oscillator is employed. The arrangement is such that, when range locking is switched, i. e. the present invention is brought into use—it is assumed that, when searching, for a target the radar system is operated as a normal frequency modulated radar system—the frequency sweep is held back in amplitude by a subsidiary biassing voltage applied by a storage condenser thrown into the circuit in a charged condition. This condenser is shunted by a leak resistance of high value. After a period of a few seconds, during which the unit PC finds its initial adjustment, the subsidiary bias voltage will have leaked away allowing the frequency modulating swing to come up to its normal value—so that the required full deviation is obtained.

As already stated the illustrated system has been described only as regards parts required by this invention. In practice it would include also arrangements for automatically tuning in the Doppler note, and automatically centering the aerials in azimuth and elevation on a target.

While I have described my invention in certain of its preferred embodiments, I realize that modifications may be made, and I desire that it be understood that no limitations upon my invention are intended other than may be imposed by the scope of the appended claims.

I claim:

1. A radar system comprising a transmitter, a ranging oscillator connected thereto to modulate the frequency thereof, a source of wobble oscillations, said source being connected to the ranging oscillator to wobble the oscillations thereof, an echo signal receiver, a mixer for mixing received signals with signals derived direct from the transmitter, means for extracting from the resultant of such mixing a component of the wobble frequency, means for comparing the extracted component with a reference frequency taken from said source to produce an error signal, and means for utilizing said error signal to control the mean frequency of the ranging oscillator to maintain said oscillator ranged upon the target from which the echo signals are reflected.

2. A system as set forth in claim 1, wherein the system is a continuous wave system.

3. A system as set forth in claim 1 wherein the oscillations fed from said source to the ranging oscillator are sinusoidal.

4. A system as set forth in claim 1, wherein the reference frequency is a squared wave.

5. A system as set forth in claim 1 including a Doppler frequency filter between the mixer and the extracting means, whereby selection may be made of targets whose radial velocities with relation to the radar system, lie within predetermined limits.

6. A system as set forth in claim 1, wherein the extracting means comprises a detector resonant at target Doppler frequencies within predetermined limits, the detector output being connected through a rectifier to a tuned circuit resonant at the wobble frequency.

References Cited in the file of this patent

UNITED STATES PATENTS

| | | |
|---|---|---|
| 2,528,119 | Crosby | Oct. 31, 1950 |
| 2,529,510 | Manley | Nov. 14, 1950 |
| 2,537,593 | Landon | Jan. 9, 1951 |